US012694165B2

(12) United States Patent
Lu et al.

(10) Patent No.: US 12,694,165 B2
(45) Date of Patent: Jul. 28, 2026

(54) METHOD AND DEVICE FOR SCHEME DESIGN OF SHEAR WALL STRUCTURE BASED ON GENERATIVE ADVERSARIAL NETWORK

(71) Applicant: Tsinghua University, Beijing (CN)

(72) Inventors: Xinzheng Lu, Beijing (CN); Wenjie Liao, Beijing (CN); Zhe Zheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 1169 days.

(21) Appl. No.: 17/697,660

(22) Filed: Mar. 17, 2022

(65) Prior Publication Data

US 2022/0207205 A1      Jun. 30, 2022

Related U.S. Application Data

(63) Continuation of application No. PCT/CN2020/131065, filed on Nov. 24, 2020.

(30) Foreign Application Priority Data

May 25, 2020      (CN) .......................... 202010446468.9

(51) Int. Cl.
$\quad$ *G06F 30/13* $\qquad$ (2020.01)
$\quad$ *G06F 30/27* $\qquad$ (2020.01)
$\quad$ *G06F 119/02* $\qquad$ (2020.01)

(52) U.S. Cl.
$\quad$ CPC .............. *G06F 30/13* (2020.01); *G06F 30/27* (2020.01); *G06F 2119/02* (2020.01)

(58) Field of Classification Search
$\quad$ CPC ...... G06F 30/13; G06F 30/27; G06F 2119/02; G06N 3/0475; G06N 3/045; G06N 3/094; G06N 3/08; G06T 11/40
$\quad$ See application file for complete search history.

(56) References Cited

FOREIGN PATENT DOCUMENTS

| CN | 109360232 |   | 2/2019 |   |   |
|---|---|---|---|---|---|
| CN | 109635511 | A * | 4/2019 | ............. | G06F 30/13 |
| CN | 110633553 |   | 12/2019 |   |   |
| CN | 110705554 | A * | 1/2020 | .......... | G06K 9/3233 |
| CN | 111666617 |   | 9/2020 |   |   |
| JP | 2006132313 | A * | 5/2006 |   |   |

(Continued)

OTHER PUBLICATIONS

Jiang, N., et al. "Object-oriented building extraction by DSM and very highresolution orthoimages." The International Archives of the Photogrammetry, Remote Sensing and Spatial Information Sciences 37 (2008): 441-446. (Year: 2008).*

(Continued)

*Primary Examiner* — Renee D Chavez
(74) *Attorney, Agent, or Firm* — Hodgson Russ LLP

(57) ABSTRACT

A method for the scheme design of shear wall structure based on a generative adversarial network includes: obtaining an architectural drawing; extracting key elements from the architectural drawing, coding the key elements by colors, and generating image features; inputting the image features into a pre-trained structural-design-oriented generative adversarial network model for processing to generate a structural drawing.

16 Claims, 6 Drawing Sheets

(56)  References Cited

FOREIGN PATENT DOCUMENTS

| WO | WO-2019148950 A1 * | 8/2019 | .......... G01M 5/0033 |
| WO | WO-2019148951 A1 * | 8/2019 | ........... G05B 19/052 |

OTHER PUBLICATIONS

Silva, Felipe Coelho, et al. "Mangan: Assisting colorization of manga characters concept art using conditional gan." 2019 IEEE International Conference on Image Processing (ICIP). IEEE, 2019. (Year: 2019).*

Xiong, Dehui, et al. "An end-to-end Bayesian segmentation network based on a generative adversarial network for remote sensing images." Remote Sensing 12.2 (2020): 216. (Year: 2020).*

Cui, Yang, et al. "Automatic 3-D reconstruction of indoor environment with mobile laser scanning point clouds." IEEE Journal of Selected Topics in Applied Earth Observations and Remote Sensing 12.8 (2019): 3117-3130. (Year: 2019).*

CNIPA, First Office Action for CN Application No. 202010446468. 9, Feb. 3, 2021.

WIPO, International Search Report for International Application No. PCT/CN2020/131065, Feb. 24, 2021.

Xiong et al., "An End-To-End Bayesian Segmentation Network Based on a Generative Adversarial Network for Remote Sensing Images," Remote Sensing, 2020, vol. 12, No. 216.

Nauata et al., "House-GAN: Relational Generative Adversarial Networks for Graph-constrained House Layout Generation," arXiv:2003. 06988, 2020.

Guo et al., "Segmentation of Branch Retinal Artery Occlusion Based on Deep Learning," Software Guide, Nov. 2019, vol. 18, No. 11.

Wang et al., "A building extraction method based on object-oriented technology and DSM image," Global Geology, Dec. 2018, vol. 37, No. 4.

* cited by examiner (a) training process of pix2pix algorithm    (b) training process of pix2pixHD algorithm StructGAN-generated shear wall design drawing comparison between StructGAN-designed shear walls
and engineer-designed shear walls

METHOD AND DEVICE FOR SCHEME DESIGN OF SHEAR WALL STRUCTURE BASED ON GENERATIVE ADVERSARIAL NETWORK

CROSS-REFERENCE TO RELATED APPLICATION(S)

The disclosure is a continuation application of International Application No. PCT/CN2020/131065, filed on Nov. 24, 2020, which claims priority to Chinese Application No. 202010446468.9, filed on May 25, 2020, the entire contents of which are incorporated herein by reference.

TECHNICAL FIELD

The disclosure relates to a field of architecture and structural engineering technologies, particularly to a method and a device for a scheme design of shear wall structure based on a generative adversarial network.

BACKGROUND

To ensure the safety and rationality of a final design result during designing high-rise shear wall residential buildings and initially designing the structure, a rapid and reasonable preliminary design of the shear wall structural components can be carried out based on the architectural drawings.

SUMMARY

Embodiments of a first aspect of the disclosure provide a method for a scheme design of shear wall structure based on a generative adversarial network. The method includes obtaining an architectural drawing, extracting key elements from the architectural drawing, coding the key elements by colors to generate image features, and inputting the image features into a pre-trained structural-design-oriented generative adversarial network model to generate a structural drawing.

Embodiments of a second aspect of the disclosure provide an electronic device including a processor, a memory, and a computer program stored on the memory and executable by the processor. When the processer executes the computer program, the method for a scheme design of shear wall structure based on a generative adversarial network, according to embodiments of the first aspect of the disclosure, is executed.

Embodiments of a third aspect of the disclosure provide a non-transitory computer-readable storage medium, having computer programs stored thereon. When the computer programs are executed by a processor, a method for a scheme design of shear wall structure based on a generative adversarial network, according to embodiments of the first aspect of the disclosure, is executed.

BRIEF DESCRIPTION OF THE DRAWINGS

The above and/or additional aspects and advantages of the disclosure will become obvious and easy to understand from the following description of the embodiments in conjunction with the accompanying drawings, in which.

DETAILED DESCRIPTION

Figure 1:
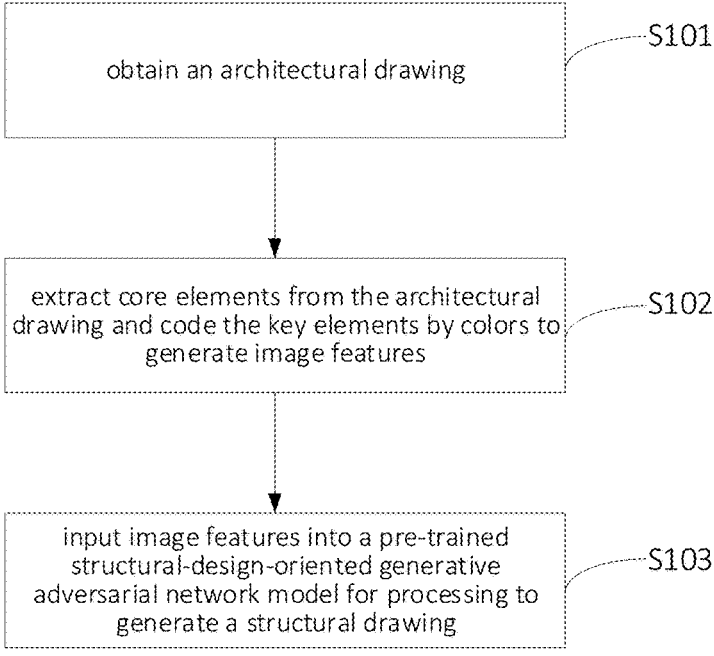
FIG. 1 is a schematic flowchart illustrating a method for a scheme design of a shear wall structure based on a generative adversarial network according to some embodiments of the disclosure.

Embodiments of the disclosure will be described in detail below. Examples of the embodiments are illustrated in the accompanying drawings, in which the same or similar reference numerals indicate the same or similar elements or elements with the same or similar functions. The embodiments described below with reference to the drawings are exemplary and intended to explain the disclosure, which cannot be understood as a limitation to the disclosure.

An excellent preliminary structural design scheme can assist the subsequent detailed design of the architectural and structural schemes. However, existing structural design methods relying on experts' experience are time-consuming and inefficient, reducing interaction and design efficiency between architectural engineers and structural engineers. In addition, the manual design relies on experience, leading to certain differences in the design results of different designers, and it is difficult to make full use of the existing resources, leading to the large variability of design results. At the same time, the existing computer-aided structural design methods are based on optimization methods, which consume huge computing resources and take a long time. Furthermore, it is challenging to utilize existing mature design outcomes by the existing methods effectively. In a word, the existing methods are hard to meet rapid design requirements in the preliminary design stage of the structure.

Accordingly, an objective of the disclosure is to provide a method for a scheme design of shear wall structure based on a generative adversarial network. By obtaining the architectural drawing to be processed, extracting the key elements from the architectural drawing, coding the key elements by colors to generate the image features, and inputting the image features into the pre-trained generative adversarial network model for structural design, the structural drawing is generated. Therefore, the structural design of shear walls can be quickly output based on the standard floor plan drawing of the architectural design, thereby realizing the quick design of the shear wall structure corresponding to the architectural design.

Hereinafter, the method and device for the scheme design of shear wall structure based on a generative adversarial network according to some embodiments of the disclosure will be described with reference to the accompanying drawings.

FIG. 1 is a flowchart illustrating a method for a scheme design of shear wall structure based on a generative adversarial network (GAN) according to embodiments of the disclosure.

As illustrated in FIG. 1, the method includes the following.

At block S101, an architectural drawing to be processed is acquired.

At block S102, key elements are extracted from the architectural drawing, and the key elements are coded by colors to generate image features.

In some embodiments of the disclosure, extracting the key elements from the architectural drawing and coding the key elements by colors to generate the image features may include the following. Shear walls, infill walls, indoor windows, and outdoor gates are extracted from the architectural drawing. The elements are coded by different colors, respectively, where red denotes the shear wall, gray denotes the infill wall, green denotes the indoor window, and blue denotes the outdoor gate.

At block S103, the image features are input into a pre-trained structural-design-oriented generative adversarial network (StructGAN) model for processing to generate a structural drawing.

In some embodiments of the disclosure, before inputting the image features into the pre-trained StructGAN model for processing to generate the structural drawing, the method may further include the following. Pairs of architectural drawing samples and structural drawing samples are acquired. Architectural sample elements are extracted from the architectural drawing samples and coded by different colors to generate architectural image features for training. Structural sample elements are extracted from the structural drawing samples and are coded by different colors to generate structural image features for training. The architectural image features and the structural image features are divided respectively into a training set and a test set. The GAN is trained based on the training set, and the StructGAN model is obtained after the training.

Further, dividing the architectural image features and the structural image features respectively into the training set and the test set includes dividing pairs of the architectural and the structural image features in the training set and the test set into a sub-training set and a sub-test set, respectively, based on structural height and structural seismic design intensity.

The StructGAN model is tested and evaluated based on the test set.

In detail, testing and evaluating the StructGAN model based on the test set may include the following. Each pixel of a generative image by the StructGAN and each pixel of a target image designed by engineers are classified based on a value range of the color of the pixel. A confusion matrix is generated based on classified pixels. A first evaluation metric is generated based on the confusion matrix. The generative image and the target image are divided into multiple sub-images. One or more shear walls are extracted from each sub-image, and contour coordinates of the share walls are obtained. An intersection area and a union area of the shear walls in the generative image and the target image are obtained. A second evaluation metric is obtained based on the intersection area and the union area.

Further, a weight coefficient is determined based on the first evaluation metric and the second evaluation metric. The evaluation is performed based on a weighted metric.

In order to make the above-mentioned embodiments clear to those skilled in the art, a detailed description will be given below in conjunction with FIGS. 2 to 9.

Figure 2:
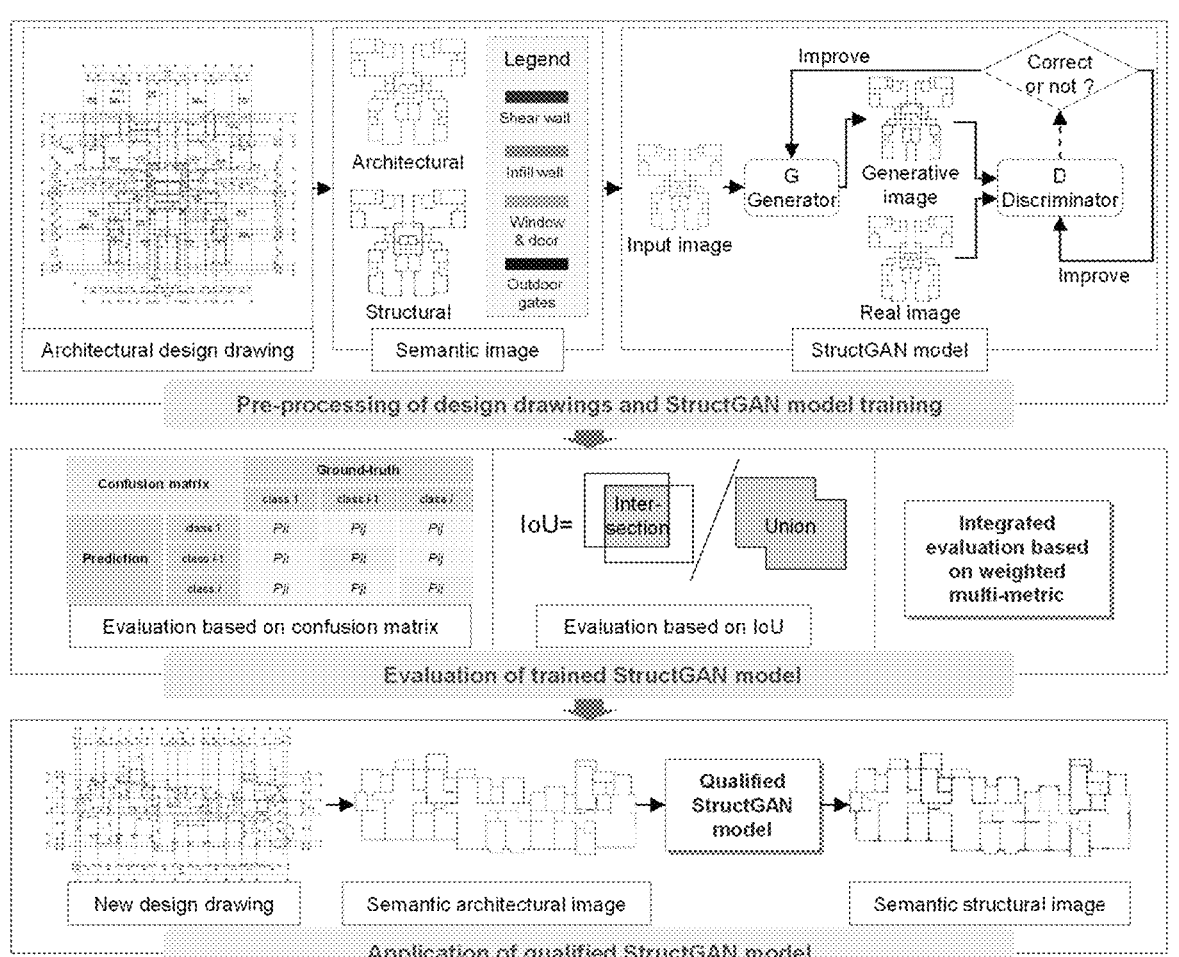
FIG. 2 is a schematic diagram illustrating a detailed framework of a method for a scheme design of shear wall structure based on a generative adversarial network according to some embodiments of the disclosure.

FIG. 2 is a schematic diagram illustrating a detailed framework of a method for a scheme design of shear wall structure based on a GAN according to embodiments of the disclosure.

As illustrated in FIG. 2, pairs of architectural-structural CAD drawing datasets of high-rise shear wall residential buildings are collected. The key elements in the CAD drawings are semantically filtered. The datasets are collated and divided, and the StructGAN model is trained based on the datasets. Model evaluation is conducted after training the StructGAN model. In the evaluation, structural drawings are generated by inputting drawings of the test set into the StructGAN model, and the difference between the generated structural drawings and target structural drawings is evaluated. The qualified StructGAN model is determined to be applied after the evaluation. New architectural design drawings are semanticized and input to the qualified StructGAN model to generate corresponding shear wall designs. The new structural designs are conducted by the engineer-based design method and the StructGAN-based rapid design method (i.e., according to embodiments of the disclosure), respectively. Subsequently, dynamic characteristics and design results of the share wall designs are compared with each other to verify the safety and rationality of the design result based on the method provided in the disclosure.

Collating the pairs of architectural-structural CAD drawing datasets of high-rise shear wall residential buildings and semantically filtering the key elements of the CAD drawings can include the following. A total of 187 structural drawings were collected, including structural drawings with different heights and different seismic design intensities. Elements contained in all drawings are filtered, and only walls, doors, windows, and gates are left in the drawings. In other words, unnecessary information in conventional CAD drawings, such as grids, annotations, furniture, and text information, is removed. Semantic pre-processing is performed on the elements of the CAD drawings. The key elements of the drawings are coded by 4 colors, where red denotes the shear wall, gray denotes the infill wall, green denotes the indoor window, and blue denotes the outdoor gate.

Figure 3:
FIG. 3 is a schematic diagram illustrating a pair of typical training-testing image datasets according to some embodiments of the disclosure.

Collating and dividing the datasets can include the following. FIG. 3 illustrates typical training-test image sets after collection and semanticization. Based on collected drawing information, the design results are divided into two groups based on the structural height, namely Level 1 (e.g., the height is less than 50 m) and Level 2 (e.g., the height is higher than 50 m and less than 140 m), and further classified based on the structural seismic design intensity, e.g., 7-degree seismic intensity and 8-degree seismic intensity. Totally 4 groups are obtained, and these groups are numbered. Note that when the structural seismic design intensity is 8-degree, the design results of the shear wall structure belonging to the Level 1 is similar to those belonging to the Level 2, indicating that the high seismic design intensity dominates the demands for structural seismic resistance in the 8-degree seismic intensity zones with a slight influence of structural heights; thus, the designs in the 8-degree seismic intensity zones were not divided by heights. Therefore, the structural drawings are finally divided into three classes of training sets, namely Level 1 & 7-degree seismic intensity (L1-7), Level 2 & 7-degree seismic intensity (L2-7), and 8-degree seismic intensity (L1&2-8). For example, there are about 55 drawings in the training set and about 6 drawings in the test set corresponding to the L1-7. There are about 55 drawings in the training set and about 6 drawings in the test set corresponding to the L2-7. There are about 57 drawings in the training set and about 6 drawings in the test set corresponding to the L1&2-8.

Figure 4:
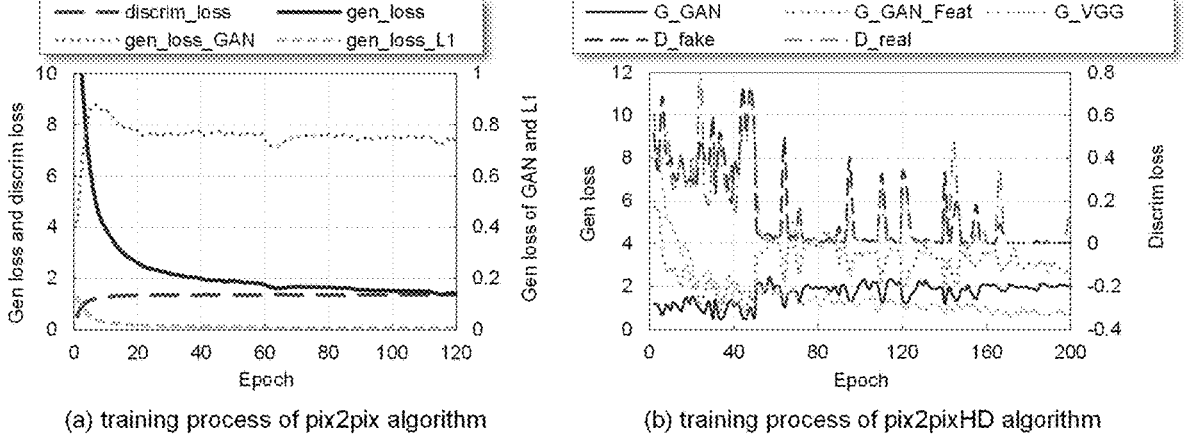
FIG. 4 is a schematic diagram illustrating a training process of a generative adversarial network according to some embodiments of the disclosure.

Selecting and training the GAN algorithm may include the following. FIG. 4 is a schematic diagram illustrating a training process of a GAN algorithm. Applicable GAN algorithms include pix2pix and pix2pixHD algorithms. The key parameters of the pix2pix algorithm are $\gamma_{GAN}$ and $\gamma_{L1}$, and the partial and overall effects of the image are determined by the relative values of these two parameters. As the relative value of $\gamma_{GAN}$ increases, the partial effect of the generative image is improved. As the relative value of $\gamma_{L1}$ increases, the overall effect of the generative image is improved. Analysis results show that the pix2pix algorithm works better when $\gamma_{GAN}=1$ and $\gamma_{L1}=100$ for a shear wall generation task. The key parameter of the pix2pixHD algorithm is $\gamma_{FM}$. The vital hyperparameter $\gamma_{FM}$ affects the overall quality of the generated image by adjusting the proportion of the feature matching loss to the total loss. Analysis results show that the pix2pixHD algorithm is better when $\gamma_{FM}=10$. Both the pix2pix and the pix2pixHD algorithms can provide good design results, and generally, the pix2pixHD algorithm outperforms the pix2pix algorithm. Furthermore, training based on the pix2pixHD algorithm requires higher hardware conditions. For example, using the pix2pixHD algorithm to train an image with a resolution of 2048×1024 requires an NVIDIA graphics card with 24G memory, while the pix2pix algorithm can be used in NVIDIA graphics cards with 6G memory. Therefore, the algorithms can be selected based on the hardware conditions during application. In the disclosure, the pix2pixHD algorithm with a resolution of 1024×512 is adopted. After choosing the algorithm, the training sets are adopted to train the StructGAN model until the training loss is stable.

In addition, there are three evaluation methods to evaluate the trained StructGAN model.

Evaluation method 1: the evaluation based on semantic classification of image pixels. A value range of the color of each pixel of the generative image is determined. The key element represented by each pixel is determined based on the value range. A confusion matrix is generated by comparing the pixel classification results of the generative image and the pixel classification results of the target image, and used to perform the evaluation. Evaluation method 1 includes the following.

Figure 5:
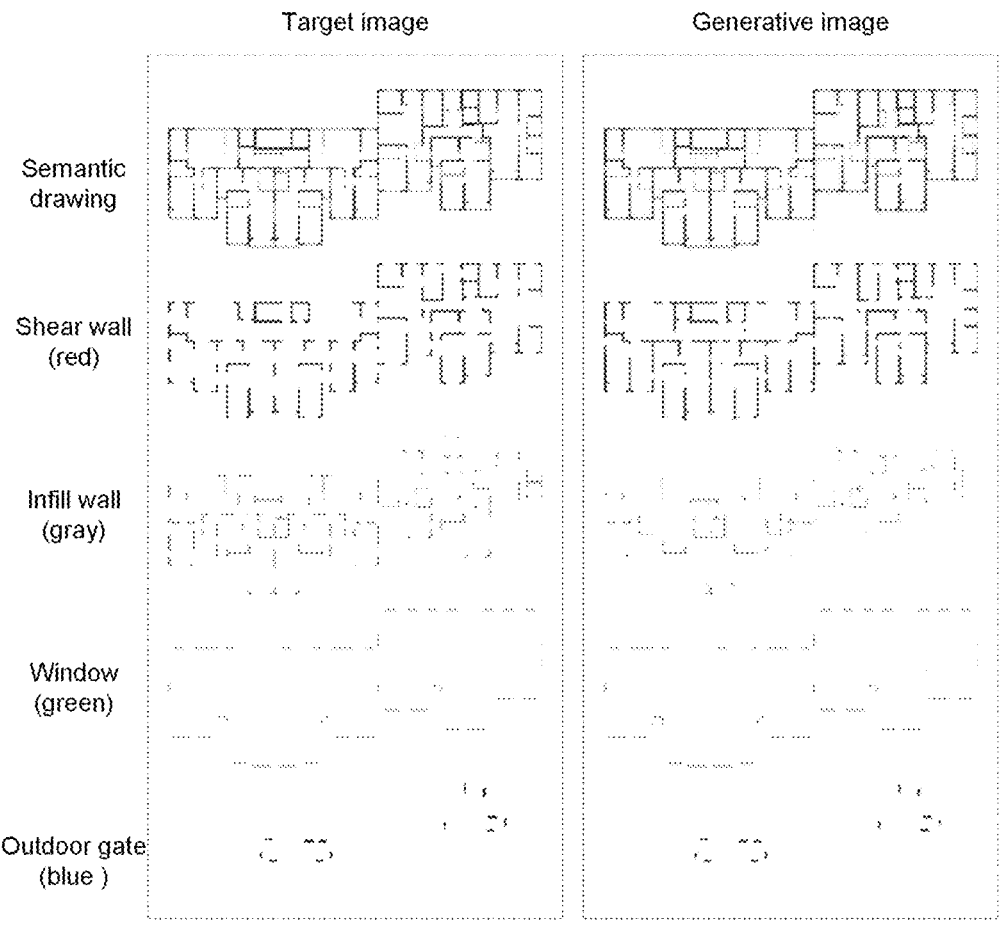
FIG. 5 is a schematic diagram illustrating results of extracting key elements from a generative image and a target image, respectively, according to some embodiments of the disclosure.

1) A class of each pixel of the image is determined based on an HSV (hue, saturation, value) of the pixel, and pixels are segmented. Since RGB (red, green, blue) values of different colors of the image are discrete, which is not conducive to application, Open Source Computer Vision (OpenCV) library can be adopted for image processing to convert the RGB value into an HSV mode. The value ranges are provided in Table 1, and the segmentation result of elements is illustrated in FIG. 5.

2) After the pixels of the image are classified, a class matrix of pixels can be obtained for each image. The matrix is reorganized to obtain vectors. The vectors of the generative image and the target image are input into the "sklearn-.metrics.confusion_matrix(y_true, y_pred)" API (application programming interface) to obtain the confusion matrix shown in Table 2.

3) Based on the confusion matrix and the pixel extraction result, the corresponding evaluation metrics are generated, including a weighted intersection-over-union (WIoU, Equation (1)), and a ratio of shear walls to total walls (shear wall ratio, SWratio, Equation (2)).

TABLE 1 adopted value range of 5 colors in the HSV

|  | Background (white) | Shear Wall (red) | Infill wall (gray) | | Window (green) | Outdoor gate (blue) |
|---|---|---|---|---|---|---|
| Hmin | 0 | 0 | 0 | 156 | 35 | 100 |
| Hmax | 180 | 180 | 10 | 180 | 77 | 124 |
| Smin | 0 | 0 | 43 | | 43 | 43 |
| Smax | 30 | 43 | 255 | | 255 | 255 |
| Vmin | 221 | 46 | 46 | | 46 | 46 |
| Vmax | 255 | 220 | 255 | | 255 | 255 |

TABLE 2 confusion matrix

|  | Background (white) | Shear wall (red) | Infill wall (gray) | Window (green) | Outdoor gate (blue) |
|---|---|---|---|---|---|
| Background | 489246 | 1414 | 42 | 228 | 27 |
| Shear Wall | 824 | 6706 | 958 | 37 | 0 |
| Infill wall | 948 | 4559 | 9292 | 51 | 3 |
| Window | 386 | 21 | 2 | 8726 | 0 |
| Outdoor gate | 157 | 15 | 1 | 0 | 645 |

$$WIoU = \sum_{i=0}^{k} \frac{w_i p_{ii}}{\sum_{j=0}^{k} p_{ij} + \sum_{j=0}^{k} p_{ji} - p_{ii}} \quad (1)$$

$$SWratio = \frac{A_{swall}}{A_{swall} + A_{inwall}} \quad (2)$$

where, (k+1) is the total class of pixels (class 0 is background, class 1 is shear wall, class 2 is infill wall, class 3 is window, class 4 is outdoor gate), $p_{ij}$ is the number of pixels of class i inferred to belong to class j. In other words, $p_{ij}$ represents the number of truly generated pixels, whereas $p_{ij}$ and $p_{ji}$ are the numbers of false generated pixels, $w_0=0$, $w_1=0.4$, $w_2=0.4$, $w_3=0.4$, $w_3=0.1$, $w_4=0.1$ representing pixel weights of 5 classes. $A_{swall}$ is an area of shear wall, and $A_{inwall}$ is an area of infill wall.

Figure 6:
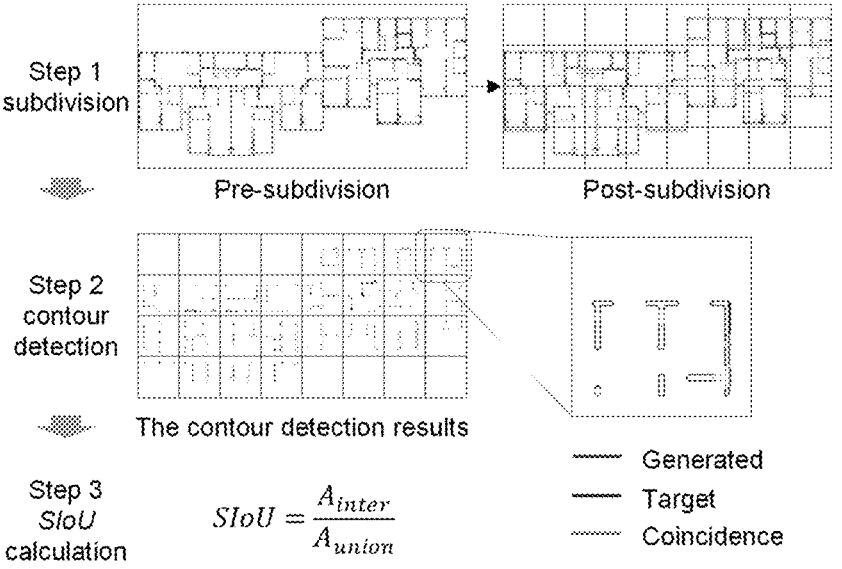
FIG. 6 is a schematic diagram illustrating an evaluation method based on a ratio of an intersection area to a union area of shear walls according to some embodiments of the disclosure.

Evaluation method 2: the evaluation based on intersection-over-union of contour detection of shear walls. The intersection areas and union areas of the detected shear wall contours are obtained by detecting the shear wall contours in the generative image and shear wall contours in the target image. The shear wall generation is evaluated. If the generated shear walls completely match the target shear walls, the result is 1. If the generated shear walls completely mismatch the target shear walls, the result is 0. As illustrated in FIG. 6, Evaluation method 2 includes the following.

1) The generative image and the target image are divided respectively into multiple sub-images.

2) One or more shear walls are extracted from each sub-image based on the HSV information provided in Table 1, and contour coordinates of each shear wall contained in each sub-image are obtained based on the API of OpenCV.findContours (image).

3) The intersection and union areas of the shear walls in the generative and target images are obtained based on the API of shapely.geometry.Polygon (coordinates), and the ratio of the intersection area to the union area of the shear wall (structural intersection over union, SIoU) is obtained with Equation (3):

$$SIoU = \frac{A_{inter}}{A_{union}} \qquad (3)$$

where, $A_{inter}$ is the intersection area of the generated shear walls and the target shear walls, $A_{union}$ is the union area of the generated shear walls and the target shear walls, $A_{union}=A_{tar}+A_{out}-A_{inter}$, $A_{tar}$ is the shear wall area of the target image, and $A_{out}$ is the shear wall area of the generative image.

Evaluation method 3: the integrated evaluation based on weighted multi-metric, fusing Evaluation method 1 and Evaluation method 2 to obtain a comprehensive evaluation metric. An IoU comprehensive score is obtained by Equation (4):

$$Score=IoU=(\eta SW_{ratio}\times(\eta SIoU\times SIoU-\eta WIoU\times WIoU)) \qquad (4)$$

where, $\eta SW_{ratio}=1-|SWratio_{out}-SWratio_{tar}|/SWratio_{out}$ and SW ratio$_{tar}$ are the shear wall ratios (SWratio) of the generative image and the target image, respectively, $\eta SIoU$ is a coefficient of the SIoU, which is 0.5; $\eta SIoU$ is a coefficient of WIoU, which is 0.5.

The trained StructGAN model is tested with a corresponding test dataset, and a final evaluation result based on evaluation methods proposed in the disclosure is shown in Table 3. When the comprehensive evaluation metric of the integrated evaluation based on weighted multi-metric exceeds 0.5, it can be considered that the generation result is outstanding, and thus the StructGAN model can be adopted for application.

designed and StructGAN-based design drawings, according to the disclosure. Subsequently, The dynamic characteristics and similarities of these two design results are compared with each other to verify the safety and rationality of the design results based on the method according to the disclosure.

Figure 7:
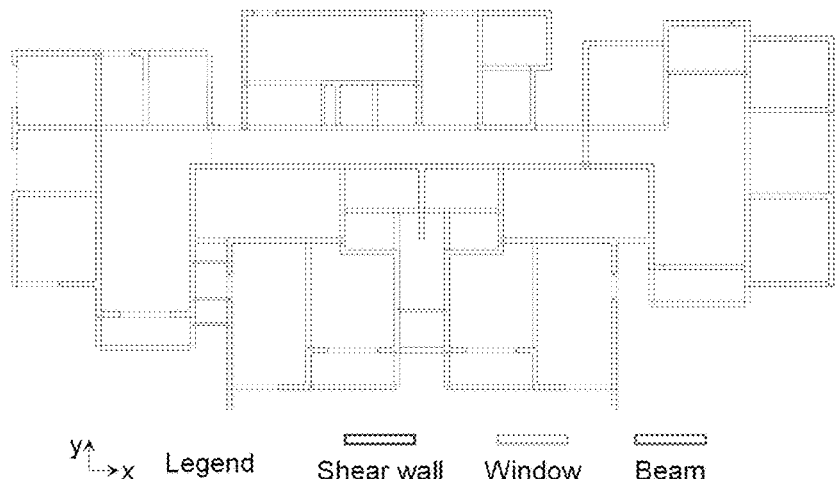
FIG. 7 is a schematic diagram illustrating a standard floor plan design drawing of an engineer-designed shear wall structure according to some embodiments of the disclosure.
Figure 8:
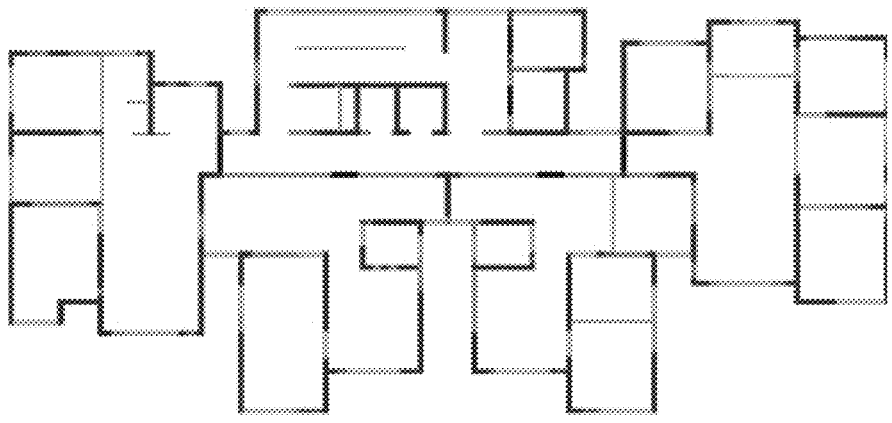
FIG. 8 is a schematic diagram illustrating a comparison between a shear wall design drawing output by StructGAN (structural-design-oriented generative adversarial network) and an engineer-design result according to some embodiments of the disclosure.
Figure 8:
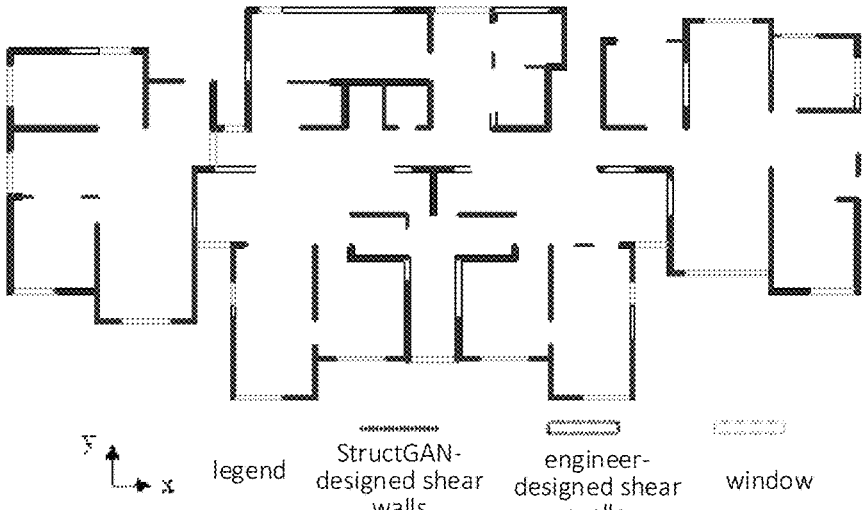

A structural design is accomplished by a structural engineer and adopted as the benchmark design. The structure is a 38-story shear wall residential building with a total height of 103 m, where fifth to thirty-sixth floors are standard, the floor heights are all 2.9 m, the classification of design earthquake is Group 2, the seismic design intensity is 7-degree (0.15 g), the site class is Class II, and the shear wall structural seismic grade is Grade 2. Note that the aforementioned seismic design conditions are specified by the Code for Seismic Design of Buildings in China. The design result of the standard floors of the structure is illustrated in FIG. 7. Subsequently, according to the disclosure, the method is adopted to generate the shear wall structural design of the standard floor plan, as illustrated in FIG. 8. The design result obtained by StructGAN is evaluated, and the evaluation results are provided in Table 4.

TABLE 4

| quantitatively evaluating design result of the shear walls provided by StructGAN | | | | |
|---|---|---|---|---|
| SWratio$_{tar}$ | SWratio$_{out}$ | SIoU | WIoU | Score$_{IoU}$ |
| 0.64 | 0.73 | 0.64 | 0.52 | 0.50 |

Subsequently, an engineer-designed structural model is adjusted accordingly based on the structural drawing of the shear walls generated by the StructGAN. The process of converting the semantic drawing into the structural model includes the following.

1) The bitmap of the shear wall design is attached to the AutoCAD drawing of the original architectural design using the attach function in AutoCAD.

2) The coordinates and length of the StructGAN-designed shear walls are obtained based on a dimension function in AutoCAD.

3) An engineer-designed structural model is adjusted in a PKPM software based on the coordinates of the StructGAN-designed shear walls obtained in Step 2).

TABLE 3

| evaluation of the test result | | | | |
|---|---|---|---|---|
| evaluation method | evaluation metric | L1-7 | L2-7 | L1&2-8 |
| evaluation based on IoU of contour detection of shear wall area | SIoU (structural intersection over union) | 0.43 | 0.62 | 0.75 |
| evaluation based on pixel semantic classification | WIoU (weighted intersection over union) | 0.59 | 0.62 | 0.72 |
| | SWratio (shear wall ratio) target value; generated value; offset | 0.40; 0.50; 21% | 0.57; 0.67; 15% | 0.66; 0.79; 19% |
| integrated evaluation based on weighted multi-metric | Score$_{IoU}$ (IoU comprehensive score) | 0.40 | 0.53 | 0.59 |

Further, the new architectural design drawings are semanticized and input into the qualified StructGAN model to generate the corresponding shear wall designs. The new shear wall structural design drawings include engineer- 4) The following principles are adopted for establishing the structural analysis model. In the event that certain pixels of the auto-designed shear wall are missing, the shear wall is considered continuous if pixels of the shear wall exist within that length. Shear walls with a length shorter than the wall thickness (i.e., 200 mm) are excluded. Only the shear wall length of the structural design of the StructGAN is adjusted without altering any other properties, such as the section thickness and material properties, to maintain a better comparison of the designs of the StructGAN and engineered design. After the shortening (or extension) of the shear wall length, the connected beams are extended (or shortened) to maintain the completeness of the structural analysis model.

FIG. 8 illustrates a detailed comparison between the engineer-designed shear walls and the StructGAN-designed shear walls. It can be seen that: 1) the StructGAN-designed shear walls are highly coincident with the structural engineer-designed shear walls; 2) layouts of the StructGAN-designed shear walls are relatively discrete, and there are some short-leg shear walls; and 3) from the perspective of the number of walls and an overall view of the walls, the results provided by the StructGAN have no obvious errors, which can basically meet the design requirements. Subsequently, the engineer-designed model and the StructGAN-designed model are analyzed using PKPM software, and the corresponding analysis results are compared.

Figure 9:
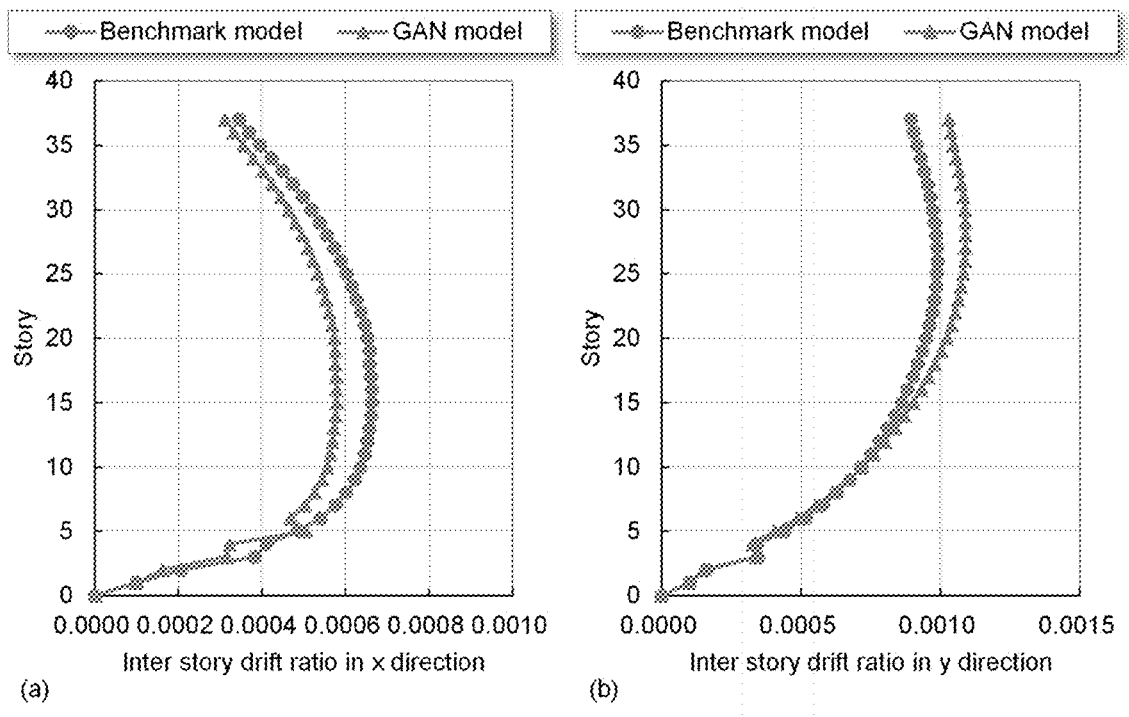
FIG. 9 is a schematic diagram illustrating a comparison between inter-story drift ratios of structural designs by StructGAN (structural-design-oriented generative adversarial network) and an engineer, according to some embodiments of the disclosure.

Comparison results of the overall metric of the PKPM analysis results are listed in Table 5 and illustrated in FIG. 9. According to Table 5, it can be seen that the StructGAN-designed model is basically the same as the engineer-designed model in terms of overall quality and dynamic characteristics. In addition, a key metric for structural design resisting lateral force is the envelope of inter-story drift ratio. The difference between the StructGAN-designed and the engineer-designed models is about 10%. Therefore, the difference between the StructGAN-designed structural scheme and the engineers-optimized design result is only about 10% which is within an acceptable difference range, indicating that the design result provided by the method according to the disclosure is reliable.

TABLE 5

| comparison of the overall metric of structural design results | | | | |
|---|---|---|---|---|
| order of mode | engineer-designed model | StructGAN-designed model period (s) | difference | mode |
| 1 | 2.7503 | 2.8727 | 4% | Y |
| 2 | 2.2255 | 2.0971 | −6% | X |
| 3 | 1.5274 | 1.6355 | 7% | T |
| | | mass (ton) | | |
| 1D + 0.5 L direction | 23098 | 22988 | 0% | |
| | | maximum inter-story drift ratio (rad) | | |
| x | 0.00066 | 0.00058 | −13% | |
| y | 0.00099 | 0.00109 | 10% | |

In order to implement the above-mentioned embodiments, the disclosure also provides a device for a scheme design of shear wall structure based on a generative adversarial network.

Figure 10:
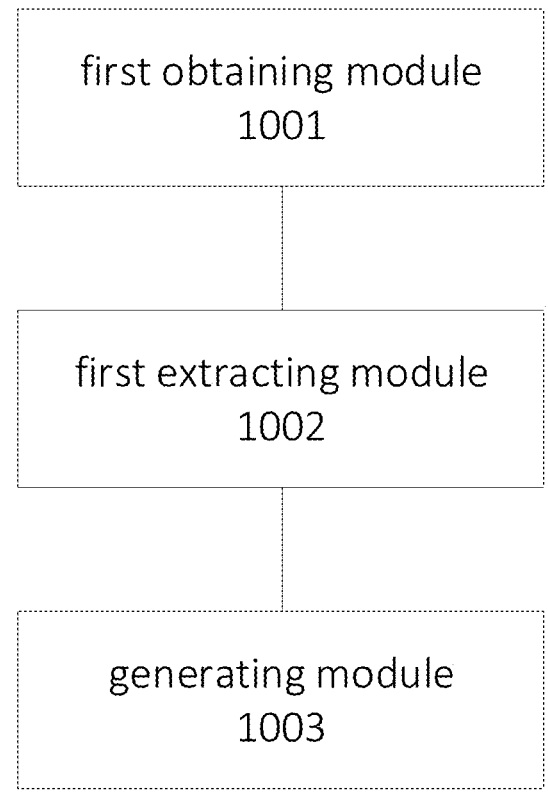
FIG. 10 is a schematic diagram illustrating a device for a scheme design of shear wall structure based on a generative adversarial network according to some embodiments of the disclosure.

FIG. 10 is a schematic diagram illustrating a device for a scheme design of shear wall structure based on a generative adversarial network according to some embodiments of the disclosure.

As illustrated in FIG. 10, the device includes: a first obtaining module 1001, a first extracting module 1002, and a generating module 1003.

The first obtaining module 1001 is configured to obtain an architectural drawing to be processed.

The first extracting module 1002 is configured to extract key elements from the architectural drawing, and code the key elements by colors to generate image features to be input.

The generating module 1003 is configured to input the image features to be input into a pre-trained structural-design-oriented generative adversarial network model for processing to generate a structural drawing.

Further, in some embodiments of the disclosure, the device further includes: a second obtaining module, a second extracting module, a third extracting module, a dividing module, a training module, and an evaluating module. The second obtaining module is configured to obtain pairs of architectural drawing samples and structural drawing samples. The second extracting module is configured to extract architectural sample elements from the architectural drawing samples and code the architectural sample elements by different colors to generate architectural image features for training. The third extracting module is configured to extract structural sample elements from the structural drawing samples, and code the structural sample elements by different colors to generate structural image features for training. The dividing module is configured to divide the architectural image features and the structural image features into a training set and a test set. The training module is configured to train the GAN based on the training set and obtain the StructGAN model after the training. The evaluating module is configured to evaluate the design effect of the StructGAN model. A qualified model that is evaluated based on the proposed three evaluation methods can be adopted for application.

Note that, the foregoing explanation of the method embodiments is also applicable to the device embodiments, which are not repeated here.

In the device for the scheme design of shear wall structure based on a generative adversarial network according to the embodiment of the disclosure, the architectural drawing to be processed is obtained. The key elements are extracted from the architectural drawing. The key elements are coded by different colors to generate the image features to be input. The image features to be input are input into the pre-trained structural-design-oriented generative adversarial network model for processing to generate the structural drawing. Therefore, it is possible to quickly output the corresponding structural design of shear walls based on the standard floor plan drawing of the architectural design, thereby realizing the rapid design of the shear wall structure corresponding to the architectural design.

In order to implement the above-mentioned embodiments, the disclosure further provides an electronic device, including a memory, a processor, and a computer program stored on the memory and executable by the processor. When the processor executes the program, the method for the scheme design of shear wall structure based on a generative adversarial network, as described in the foregoing method embodiments, is applied to a terminal device.

In order to implement the above-mentioned embodiments, the disclosure further provides a computer-readable storage medium, having a computer program stored thereon. When the program is executed by a processor, the method for the scheme design of shear wall structure based on a generative adversarial network, as described in the foregoing method embodiments, is implemented.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the disclosure, "a plurality of" means at least two, such as two, three, etc., unless specifically defined otherwise.

In the description of this specification, descriptions with reference to the terms "one embodiment", "some embodiments", "examples", "specific examples", or "some examples" etc. mean specific features structures, materials, or characteristics described in conjunction with the embodiments or examples are included in at least one embodiment or example of the disclosure. In this specification, the schematic representations of the above terms do not necessarily refer to the same embodiment or example. Moreover, the described specific features, structures, materials, or characteristics can be combined in any one or more embodiments or examples in a suitable manner. In addition, those skilled in the art can combine and combine the different embodiments or examples and the features of the different embodiments or examples described in this specification without contradicting each other.

Although the embodiments of the disclosure have been shown and described above, it can be understood that the above-mentioned embodiments are exemplary and should not be construed as limiting the disclosure. The ordinary skill in the art can make any changes, modifications, substitutions, and variants on the foregoing embodiments within the scope of the disclosure.

What is claimed is:

1. A method for the scheme design of shear wall structure based on a generative adversarial network, comprising:

obtaining, via an input interface of an electronic device, an architectural drawing of a high-rise shear wall residential building;

extracting, via a processor of the electronic device, key elements from the architectural drawing and coding, using a mapping relationship between key elements and colors stored in a local memory of the electronic device, the key elements by colors to generate image features; and inputting, via the processor of the electronic device, the image features into a pre-trained structural-design-oriented generative adversarial network model for processing to generate and output, via an output interface of the electronic device, a structural drawing;

wherein the structural-design-oriented generative adversarial network model is tested and evaluated based on a test set by:

dividing a generative image and a target image into multiple sub-images;

extracting one or more shear walls from each sub-image, and obtaining contour coordinates of the one or more shear walls;

obtaining an intersection area and a union area of the shear walls contained in the generative image and the target image, wherein the intersection area is an area of an intersection between generated shear walls contained in the generative image and target shear walls contained in the target image, and the union area is a difference by subtracting the intersection area from a sum of an area of generated shear walls contained in the generative image and an area of target shear walls contained in the target image; and obtaining a second evaluation metric based on the intersection area and the union area, to output a qualified generative image satisfying the second evaluation metric.

2. The method of claim 1, further comprising:

obtaining pairs of architectural drawing samples and structural drawing samples;

extracting architectural sample elements from the architectural drawing samples and coding the architectural sample elements by colors to generate architectural image features;

extracting structural sample elements from the structural drawing samples and coding the structural sample elements by colors to generate structural image features;

dividing the architectural image features and the structural image features into a training set and the test set; and inputting the training set into a generative adversarial network to train the generative adversarial network and obtaining the structural-design-oriented generative adversarial network model after the training.

3. The method of claim 1, wherein extracting the key elements from the architectural drawing and coding the key elements by colors comprises:

extracting a shear wall, an infill wall, an indoor window, and an outdoor gate from the architectural drawing; and coding the shear wall, the infill wall, the indoor window, and the outdoor gate by different colors, where red represents the shear wall, gray represents the infill wall, green represents the indoor window, and blue represents the outdoor gate.

4. The method of claim 2, wherein dividing the architectural image features and the structural image features into the training set and the test set comprises:

dividing the architectural image features and the structural image features in the training set and the test set into a sub-training set and a sub-test set, respectively, based on structural height and structural seismic design intensity.

5. The method of claim 1, wherein the structural-design-oriented generative adversarial network mode is tested and evaluated based on the test set by:

classifying each pixel of a generative image and each pixel of a target image, based on a value range of pixel color of the generative image and a value range of pixel color of the target image; and generating a confusion matrix based on classified pixels, and obtaining a first evaluation metric based on the confusion matrix.

6. The method of claim 1, wherein the structural-design-oriented generative adversarial network model is tested and evaluated based on the test set by:

classifying each pixel of a generative image and each pixel of a target image based on a value range of pixel color of the generative image and a value range of pixel color of the target image;

generating a confusion matrix based on classified pixels, and generating a first evaluation metric based on the confusion matrix;

dividing the generative image and the target image into multiple sub-images;

extracting one or more shear walls from each sub-image and obtaining contour coordinates of the one or more shear walls; and obtaining an intersection area and a union area of the shear walls contained in the generative image and the target image, and generating a second evaluation metric based on the intersection area and the union area;

wherein the method further comprises:

determining a weight coefficient based on the first evaluation metric and the second evaluation metric; and performing an evaluation based on a weighted metric.

7. An electronic device, comprising an input interface, an output interface, a processor, a memory, and a computer program stored in the memory and executable by the processor, wherein when the computer program is executed by the processor, the processor is configured to:

obtain an architectural drawing via the input interface;

extract key elements from the architectural drawing and code using a mapping relationship between key elements and colors stored in the memory, the key elements by colors to generate image features; and input the image features into a pre-trained structural-design-oriented generative adversarial network model for processing to generate and output, via the output interface, a structural drawing;

wherein the processor is further configured to:

divide a generative image and a target image into multiple sub-images;

extract one or more shear walls from each sub-image, and obtain contour coordinates of the one or more shear walls;

obtain an intersection area and a union area of the shear walls contained in the generative image and the target image, wherein the intersection area is an area of an intersection between generated shear walls contained in the generative image and target shear walls contained in the target image, and the union area is a difference by subtracting the intersection area from a sum of an area of generated shear walls contained in the generative image and an area of target shear walls contained in the target image; and obtain a second evaluation metric based on the intersection area and the union area, to output a qualified generative image satisfying the second evaluation metric.

8. The electronic device of claim 7, wherein the processor is further configured to:

obtain pairs of architectural drawing samples and structural drawing samples;

extract architectural sample elements from the architectural drawing samples and code the architectural sample elements by colors to generate architectural image features;

extract structural sample elements from the structural drawing samples and code the structural sample elements by colors to generate structural image features;

divide the architectural image features and the structural image features into a training set and the test set; and input the training set into a generative adversarial network to train the generative adversarial network and obtain the structural-design-oriented generative adversarial network model after the training.

9. The electronic device of claim 7, wherein the processor is further configured to:

extract a shear wall, an infill wall, an indoor window, and an outdoor gate from the architectural drawing; and code the shear wall, the infill wall, the indoor window, and the outdoor gate by different colors, where red represents the shear wall, gray represents the infill wall, green represents the indoor window, and blue represents the outdoor gate.

10. The electronic device of claim 7, wherein the processor is further configured to:

divide the architectural image features and the structural image features in the training set and the test set into a sub-training set and a sub-test set, respectively, based on structural height and structural seismic design intensity.

11. The electronic device of claim 7, wherein the processor is further configured to:

classify each pixel of a generative image and each pixel of a target image based on a value range of pixel color of the generative image and a value range of pixel color of the target image; and generate a confusion matrix based on classified pixels, and obtain a first evaluation metric based on the confusion matrix.

12. The electronic device of claim 7, wherein the processor is further configured to:

classify each pixel of a generative image and each pixel of a target image based on a value range of pixel color of the generative image and a value range of pixel color of the target image;

generate a confusion matrix based on classified pixels, and generate a first evaluation metric based on the confusion matrix;

divide the generative image and the target image into multiple sub-images;

extract one or more shear walls from each sub-image and obtain contour coordinates of the one or more shear walls;

obtain an intersection area and a union area of the shear walls contained in the generative image and the target image, and generate a second evaluation metric based on the intersection area and the union area;

determine a weight coefficient based on the first evaluation metric and the second evaluation metric; and perform an evaluation based on a weighted metric.

13. A non-transitory computer-readable storage medium, having a computer program stored thereon, wherein when the computer program is executed by a processor of an electronic device, a method for the scheme design of shear wall structure based on a generative adversarial network is implemented, wherein the method comprises:

obtaining, via an input interface of the electronic device, an architectural drawing of a high-rise shear wall residential building;

extracting key elements from the architectural drawing and coding, using a mapping relationship between key elements and colors stored in a local memory of the electronic device, the key elements by colors to generate image features; and inputting the image features into a pre-trained structural-design-oriented generative adversarial network model for processing to generate and output, via an output interface of the electronic device, a structural drawing;

wherein the structural-design-oriented generative adversarial network model is tested and evaluated based on a test set by:

dividing a generative image and a target image into multiple sub-images;

extracting one or more shear walls from each sub-image, and obtaining contour coordinates of the one or more shear walls;

obtaining an intersection area and a union area of the shear walls contained in the generative image and the target image, wherein the intersection area is an area of an intersection between generated shear walls contained in the generative image and target shear walls contained in the target image, and the union area is a difference by subtracting the intersection area from a sum of an area of generated shear walls contained in the generative image and an area of target shear walls contained in the target image; and obtaining a second evaluation metric based on the intersection area and the union area, to output a qualified generative image satisfying the second evaluation metric.

14. The non-transitory computer-readable storage medium of claim 13, wherein the method further comprises:

obtaining pairs of architectural drawing samples and structural drawing samples;

extracting architectural sample elements from the architectural drawing samples and coding the architectural sample elements by colors to generate architectural image features;

extracting structural sample elements from the structural drawing samples and coding the structural sample elements by colors to generate structural image features;

dividing the architectural image features and the structural image features into a training set and the test set; and inputting the training set into a generative adversarial network to train the generative adversarial network and obtaining the structural-design-oriented generative adversarial network model after the training.

15. The non-transitory computer-readable storage medium of claim 14, wherein extracting the key elements from the architectural drawing and coding the key elements by colors comprises:

extracting a shear wall, an infill wall, an indoor window, and an outdoor gate from the architectural drawing; and coding the shear wall, the infill wall, the indoor window, and the outdoor gate by different colors, where red represents the shear wall, gray represents the infill wall, green represents the indoor window, and blue represents the outdoor gate.

16. The non-transitory computer-readable storage medium of claim 14, wherein dividing the architectural image features and the structural image features into the training set and the test set comprises:

dividing the architectural image features and the structural image features in the training set and the test set into a sub-training set and a sub-test set, respectively, based on structural height and structural seismic design intensity.

* * * * *